(12) United States Patent
Kim et al.

(10) Patent No.: US 9,684,113 B2
(45) Date of Patent: Jun. 20, 2017

(54) LIGHT GUIDE PLATE, AND BACKLIGHT UNIT AND DISPLAY DEVICE INCLUDING THE SAME

(71) Applicant: New Optics, Ltd, Yangju-si (KR)

(72) Inventors: Dong-Yong Kim, Cheonan-si (KR); Jong-Moon Yoon, Yangju-si (KR); Min-Kyoung Park, Seoul (KR)

(73) Assignee: New Optics, Ltd, Yangju-si (KR)

( * ) Notice: Subject to any disclaimer, the term of this patent is extended or adjusted under 35 U.S.C. 154(b) by 38 days.

(21) Appl. No.: 14/828,724

(22) Filed: Aug. 18, 2015

(65) Prior Publication Data
US 2016/0047965 A1 Feb. 18, 2016

Related U.S. Application Data

(60) Provisional application No. 62/038,723, filed on Aug. 18, 2014.

(30) Foreign Application Priority Data

Mar. 31, 2015 (KR) ........................ 10-2015-0045740

(51) Int. Cl.
*F21V 8/00* (2006.01)
(52) U.S. Cl.
CPC .................................. *G02B 6/0036* (2013.01)
(58) Field of Classification Search
CPC .. G02B 6/0055; G02B 6/0045; G02B 6/0036; G02B 6/0065
See application file for complete search history.

(56) References Cited

U.S. PATENT DOCUMENTS

| | | | | |
|---|---|---|---|---|
| 6,204,903 B1* | 3/2001 | Hayashi | .................. | G02B 5/00 349/113 |
| 6,755,546 B2* | 6/2004 | Ohkawa | ............... | G02B 6/0036 362/23.15 |
| 2002/0141174 A1* | 10/2002 | Parker | .................. | A61M 21/02 362/612 |
| 2005/0270802 A1* | 12/2005 | Hsu | .................. | G02F 1/133615 362/626 |
| 2008/0025687 A1* | 1/2008 | Lee | ...................... | G02B 6/0036 385/146 |
| 2009/0316433 A1* | 12/2009 | Shim | .................... | G02B 6/0038 362/613 |

(Continued)

*Primary Examiner* — Anh Mai
*Assistant Examiner* — Fatima Farokhrooz

(57) ABSTRACT

The present invention relates to a light guide plate, and a backlight unit and display device including the same. According to an aspect of the present invention, there is provided a light guide plate, including: a light output surface configured to output light toward the outside; a reflective surface positioned at the opposite side of the light output surface; a light incident surface provided on at least one side surface among the side surfaces connecting the light output surface to the reflective surface to receive light irradiated from a light source; and a reflective pattern having a quadrilateral shape when viewed in a direction perpendicular to the reflective surface, and having a concave portion recessed toward an inner portion of the reflective surface and an embossed portion protruding from an edge of the concave portion toward an outer portion of the reflective surface.

13 Claims, 15 Drawing Sheets

(56) References Cited

U.S. PATENT DOCUMENTS

| | | | | |
|---|---|---|---|---|
| 2010/0208496 A1* | 8/2010 | Kim | ............... | B29D 11/00663 362/613 |
| 2010/0328576 A1* | 12/2010 | Kinoshita | ............ | G02B 6/0038 349/62 |
| 2011/0109533 A1* | 5/2011 | Suzuki | ............... | G02B 6/0038 345/84 |
| 2013/0057807 A1* | 3/2013 | Goto | ................. | G02B 6/0038 349/65 |
| 2013/0093980 A1* | 4/2013 | Goto | ................. | G02B 6/0038 349/65 |
| 2014/0160397 A1* | 6/2014 | Kim | ................. | G02B 6/0036 349/65 |
| 2015/0092440 A1* | 4/2015 | Kim | ................. | G02B 6/0036 362/608 |
| 2015/0168630 A1* | 6/2015 | Park | ................. | G02B 6/0036 362/607 |

* cited by examiner

LIGHT GUIDE PLATE, AND BACKLIGHT UNIT AND DISPLAY DEVICE INCLUDING THE SAME

RELATED APPLICATIONS

This application claims the benefit of priority of both U.S. Provisional Patent Application No. 62/038,723 filed on Aug. 18, 2014, and Korean Patent Application No. 10-2015-0045740 filed on Mar. 31, 2015. The contents of the above applications are all incorporated by reference as if fully set forth herein in their entirety.

FIELD AND BACKGROUND OF THE INVENTION

The present invention relates to a light guide plate, and a backlight unit and display device including the same, and more particularly, to a light guide plate with an improved light diffusion rate, and a backlight unit and display device including the same.

As a type of a light source device supplying light behind a screen of a liquid crystal display device, a backlight unit (BLU) is a core part that not only directly affects image quality such as luminance of image, color reproducibility, field of view, a ratio of light and shade, readability, etc., power consumption, product life, and the like, but also occupies about 20 to 50% of an overall unit price of a liquid crystal display device.

The backlight unit is mainly classified into a direct-lit type and an edge-lit type in accordance with a form of light source arrangement. The direct-lit type uses light projected toward a liquid crystal panel from a light source arranged right behind a screen, whereas in the edge-lit type, a light guide plate guides light projected toward a side direction from a light source arranged at an edge of a screen toward a liquid crystal panel to supply light to a display panel. Due to the structural difference, the direct-lit type is favorable to luminance, a ratio of light and shade, screen uniformity, image reproducibility, etc., whereas the edge-lit type is advantageous in terms of the thickness or cost of a product.

Recently, in the display industry, as a value of a display product as an interior design piece has become important, the percentage of an edge-lit backlight that has a great advantage in terms of an appearance of a product is gradually increasing. In particular, consumer demand for an extremely thin display product is increasing, and to keep pace with the trend, vigorous study has been carried out to minimize the number of diffusion sheets inserted behind a display panel since three to five diffusion sheets had been inserted behind the display panel. However, a display product with the minimum number of diffusion sheets cannot secure a light diffusion rate as before, causing a hot spot to be noticeable. Consequently, development of a light guide plate with an improved light diffusion rate is rising as core technology.

SUMMARY OF THE INVENTION

An object of the present invention is to provide a light guide plate with an improved light diffusion rate, and a backlight unit and display device including the same.

Another object of the present invention is to provide a light guide plate in which a hot spot is suppressed, and a backlight unit and display device including the same.

Furthermore, still another object of the present invention is to provide a light guide plate capable of improving optical efficiency, and a backlight unit and display device including the same.

According to an aspect of the present invention, there is provided a light guide plate, including: a light output surface configured to output light toward the outside; a reflective surface positioned at the opposite side of the light output surface; a light incident surface provided on at least one side surface among the side surfaces connecting the light output surface to the reflective surface to receive light irradiated from a light source; and a reflective pattern having a quadrilateral shape when viewed in a direction perpendicular to the reflective surface, and having a concave portion recessed toward an inner portion of the reflective surface and an embossed portion protruding from an edge of the concave portion toward an outer portion of the reflective surface. Here, the concave portion includes a first inclined surface inclined from the reflective surface toward the light output surface; and a second inclined surface inclined from the first inclined surface toward the reflective surface.

In addition, according to another aspect of the present invention, there is provided a backlight unit, including: a light source to irradiate light; and a light guide plate. The light guide plate includes a light incident surface facing the light source to receive the light irradiated from the light source; a light output surface configured to output the light perpendicularly incident upon the light incident surface toward the outside; a reflective surface which is the opposite surface of the light output surface; and a plurality of reflective patterns provided at the reflective surface. Each of the reflective patterns includes a concave portion recessed toward an inner portion of the reflective surface and an embossed portion protruding from an edge of the concave portion toward an outer portion of the reflective surface to be formed in a prism shape.

According to the present invention, a scattering rate or diffusion rate of light outputted from a light guide plate can be increased by scattering light by a concave portion and an embossed portion.

In addition, according to the present invention, a light guide plate with an improved light scattering rate is used, thereby improving a hot spot.

In addition, according to the present invention, optical efficiency can be improved.

DESCRIPTION OF SPECIFIC EMBODIMENTS OF THE INVENTION

Figure 1:
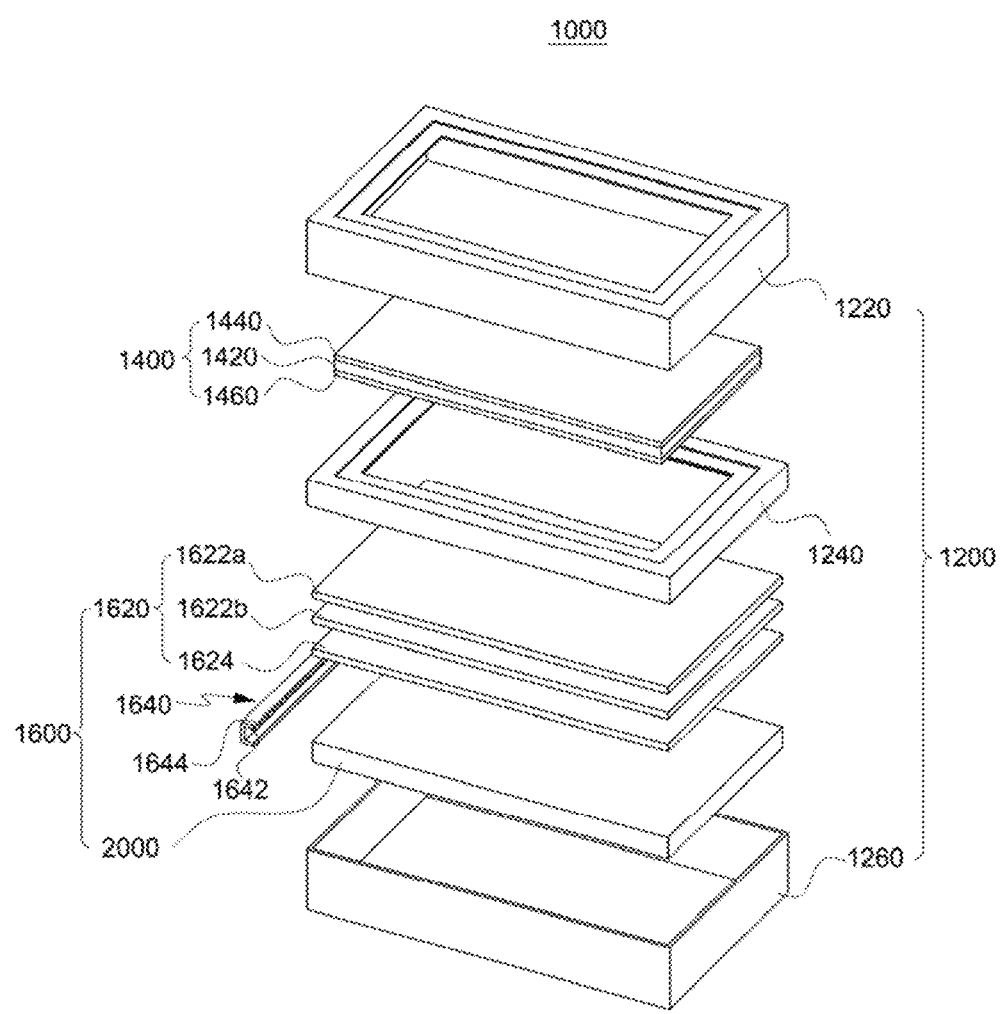
FIG. 1 is an exploded perspective view of a display device according to an embodiment of the present invention.

Hereinafter, a light guide plate, and a backlight unit and display device including the same according to an embodiment of the present invention will be described in detail with reference to the accompanying drawings.

In addition, like or similar reference numerals will be given to like or corresponding elements regardless of symbols in the drawings, and duplicate descriptions thereof will be omitted. For convenience in providing the descriptions, the size and shape of each element shown in the drawings may be exaggerated or reduced.

According to an aspect of the present invention, there is provided a light guide plate, including: a light output surface configured to output light toward the outside; a reflective surface positioned at the opposite side of the light output surface; a light incident surface provided on at least one side surface among the side surfaces connecting the light output surface to the reflective surface to receive light irradiated from a light source; and a reflective pattern having a quadrilateral shape when viewed in a direction perpendicular to the reflective surface, and having a concave portion recessed toward an inner portion of the reflective surface and an embossed portion protruding from an edge of the concave portion toward an outer portion of the reflective surface. Here, the concave portion includes a first inclined surface inclined from the reflective surface toward the light output surface; and a second inclined surface inclined from the first inclined surface toward the reflective surface.

Furthermore, in the concave portion, an inclined angle of one of the first inclined surface and the second inclined surface closer to the light incident surface may be smaller than that of the other surface.

Furthermore, the first inclined surface may have an inclined angle formed in a range of 40 to 60°, and the second inclined surface may have an inclined angle formed in a range of 50 to 70°.

Furthermore, in the concave portion, the inclined angle of the first inclined surface may be equal to that of the second inclined surface.

Furthermore, the concave portion may further include a flat surface formed between the first inclined surface and the second inclined surface and parallel to the reflective surface.

Furthermore, the embossed portion may include a first protruding region formed at an edge in which the first inclined surface comes in contact with the reflective surface; and a second protruding region formed at an edge in which the second inclined surface comes in contact with the reflective surface.

Furthermore, the size of the first protruding region may be different from that of the second protruding region.

Furthermore, the height of the first protruding region may be greater than that of the second protruding region.

Furthermore, when viewed in a direction perpendicular to the reflective surface, the area of the first protruding region may be greater than that of the second protruding region.

Furthermore, when viewed in the direction perpendicular to the light incident surface, the concave portion may further include a pair of side inclined surfaces inclined from the reflective surface toward the light output surface to come in contact with the first inclined surface and the second inclined surface, respectively.

Furthermore, inclined angles of the pair of side inclined surfaces may be equal to each other.

Furthermore, the embossed portion may further include a side protruding region formed at an edge in which the side inclined surface comes in contact with the reflective surface.

Furthermore, the size of the side protruding region may be smaller than those of the first protruding region and the second protruding region.

Furthermore, the height of the side protruding region may be smaller than those of the first protruding region and the second protruding region.

Furthermore, when viewed in the direction perpendicular to the reflective surface, the area of the side protruding region may be smaller than those of the first protruding region and the second protruding region.

In addition, according to another aspect of the present invention, there is provided a backlight unit, including: a light source to irradiate light; and a light guide plate. The light guide plate includes a light incident surface facing the light source to receive the light irradiated from the light source; a light output surface configured to output the light perpendicularly incident upon the light incident surface toward the outside; a reflective surface which is the opposite surface of the light output surface; and a plurality of reflective patterns provided at the reflective surface. Each of the reflective patterns includes a concave portion recessed toward an inner portion of the reflective surface and an embossed portion protruding from an edge of the concave portion toward an outer portion of the reflective surface to be formed in a prism shape.

The plurality of reflective patterns may be arranged parallel to the light incident surface.

Furthermore, when viewed from a side surface of the light incident surface, the concave portion may include a first inclined surface inclined from the reflective surface toward the light output surface; and a second inclined surface inclined from the first inclined surface toward the reflective surface.

Furthermore, in the concave portion, an inclined angle of one of the first inclined surface and the second inclined surface closer to the light incident surface may be smaller than that of the other surface.

Furthermore, the embossed portion may include a first protruding region formed at an edge in which the first inclined surface comes in contact with the reflective surface; and a second protruding region formed at an edge in which the second inclined surface comes in contact with the reflective surface.

Furthermore, when viewed in the direction perpendicular to the light incident surface, the concave portion may further include a pair of side inclined surfaces inclined from the reflective surface toward the light output surface to come in contact with the first inclined surface and the second inclined surface, respectively. Furthermore, the embossed portion may further include a side protruding region formed at an edge in which the side inclined surface comes in contact with the reflective surface.

Hereinafter, a display device 1000 according to an embodiment of the present invention will be described. Here, the display device 1000 should be construed as a comprehensive term that includes a liquid crystal display (LCD) device, a plasma display panel (PDP) device, and an organic light-emitting diode (OLED) display device and various other display devices outputting an image. However, hereinafter, description will be mainly given on a liquid crystal display device 1000 for convenience.

Figure 2:
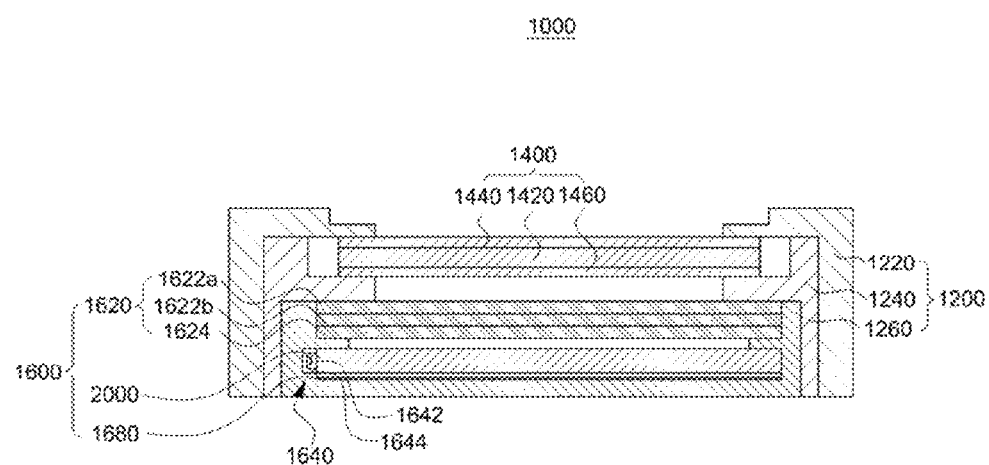
FIG. 2 is a cross-sectional view of a display device according to an embodiment of the present invention.

FIG. 1 is an exploded perspective view of a display device 1000 according to an embodiment of the present invention, and FIG. 2 is a cross-sectional view of a display device 1000 according to an embodiment of the present invention.

Referring to FIG. 1 and FIG. 2, the display device 1000 may include a housing 1200, a display panel 1400, and a backlight unit 1600.

The housing 1200 accommodates the display panel 1400 and the backlight unit 1600 therein to protect them from external impact. Furthermore, the housing 1200 has a function of matching the display panel 1400 with the backlight unit 1600.

The housing 1200 may include a top case 1220, a guide frame 1240, and a bottom cover 1260. The top case 1220 and the bottom cover 1260 are coupled to each other to respectively cover a front surface and a rear surface of the display device 1000, and the guide frame 1240 is mounted between the two. The guide frame 1240 may fixate the display panel 1400 with a bezel of the top case 1220 and fixate a light guide plate 2000 and optical sheets 1620 with the bottom cover 1260.

The display panel 1400 displays an image using light supplied from the backlight unit 1600.

The display panel 1400 may include two transparent substrates and a liquid crystal layer 1420 inserted between the two. Here, the transparent substrates may be a color filter substrate 1460 and a thin film transistor (TFT) substrate 1440, respectively. If an electrical signal is applied to the liquid crystal layer 1420 through a gate line and a data line of the thin film transistor substrate 1440, the liquid crystal arrangement is changed, and the liquid crystal layer 1420 selectively transmits light projected from the backlight unit 1600 in units of pixels. The transmitted light is colored by the color filter substrate 1460 to output an image. Here, the thin film transistor substrate 1440 may be electrically connected to a panel driver (not shown in the drawings) such as a chip on film (COF) or a tape carrier package (TCP) through a printed circuit board (PCB, not shown in the drawings) to receive a control signal.

The backlight unit 1600 supplies light behind the display panel 1400 so that the display panel 1400 can output an image.

The backlight unit 1600 may include the optical sheets 1620, a light source array 1640, the light guide plate 2000, and a reflective plate 1680.

The light source array 1640 may include a light source 1642 generating light and a light source substrate 1644 in which the light source 1642 is installed. For the light source 1642, a cold cathode fluorescent lamp (CCFL), an external electrode fluorescent lamp (EEFL), or a light-emitting diode (LED) may be used. In case of an edge-lit backlight unit 1600, the light source array 1640 may have the light source 1642 installed at an edge portion of the display device 1000 to face a side direction so that light is incident upon a side surface of the light guide plate 2000. In case of a direct-lit backlight unit 1600, the light source 1642 may be installed at the bottom cover 1260 to output light toward a rear portion of the display panel 1400. Here, the light source substrate 1644 may be installed at the bottom cover 1260, or the light source 1642 may be directly installed at the bottom cover 1260 without the light source substrate 1644.

In the edge-lit backlight unit 1600, the light guide plate 2000 may be arranged to face the rear portion of the display panel 1400. The light guide plate 2000 guides light outputted toward a side direction from the light source 1642 toward the display panel 1400. In addition, to improve optical uniformity by improving luminance or a hot spot, patterns may be respectively formed on the top surface and the bottom surface of the light guide plate 2000 and side surfaces of the light source 1642, and polymethyl methacrylate (PMMA), mild steel (MS), methyl methacrylate (MMA), and glass may be used as material of the light guide plate 2000. More specific description on the light guide plate 2000 will be given later. Meanwhile, in the case of the direct-lit backlight unit 1600, a diffusion plate diffusing light may be included instead of the light guide plate 2000 guiding light.

The optical sheets 1620 may be arranged at the rear portion of the display panel 1400 to face the display panel 1400, or between the display panel 1400 and the light guide plate 2000 when the light guide plate 2000 is present. The optical sheets 1620 may be a diffusion sheet 1624 or a prism sheet 1622. The diffusion sheet 1624 evenly diffuses light outputted from the light guide plate 2000 or a diffusion plate to improve uniformity of light output distribution, and is capable of mitigating or removing a dark/bright pattern similar to a moire phenomenon or a hot spot. The prism sheet 1622 may adjust an optical path in a direction perpendicular to the display panel 1400. The light passed through the light guide plate 2000 or the diffusion sheet 1624 is scattered and proceeded in all directions. The prism sheet 1622 enables the scattered light to be projected in a direction perpendicular to the display panel 1400, thereby improving luminance and field of view of the display device 1000. According to one example, as depicted in FIG. 1 and FIG. 2, a vertical prism sheet 1622*a*, a horizontal prism sheet 1622*b*, and the diffusion sheet 1624 may be arranged from a portion nearby the display panel 1400 as the optical sheets 1620. The optical sheets 1620 may not be arranged in the order mentioned above. In other words, some of the optical sheets 1620 may be omitted, some may be more than one (for example, two or more diffusion sheets 1624 may be arranged), or the order may be properly changed as needed.

The reflective plate 1680 may be attached to the bottom cover 1260. The reflective plate 1680 may reflect light proceeding to a rear portion of the light outputted from the light source 1642 toward the display panel 1400. The reflective plate 1680 reflects light projected toward a rear surface of the light guide plate 2000 or diffusion plate toward the display panel 1400, thereby improving luminance of an overall display device by reducing optical loss.

Hereinafter, the light guide plate 2000 according to an embodiment of the present invention will be described in more detail.

Figure 3:
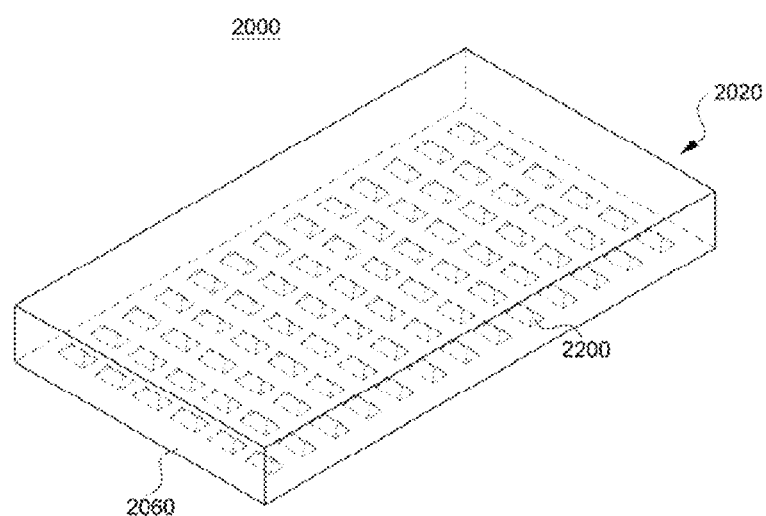
FIG. 3 is a perspective view of a light guide plate according to an embodiment of the present invention.
Figure 4:
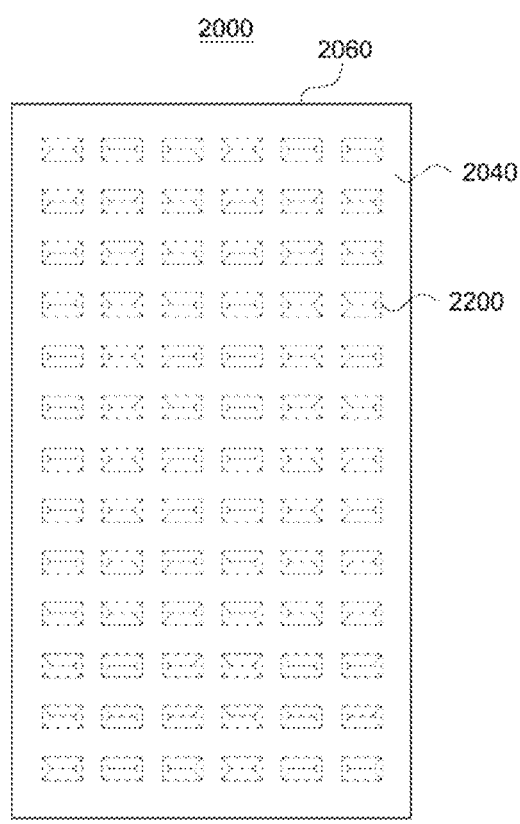
FIG. 4 is a rear view of a light guide plate with uniform density of reflective patterns according to an embodiment of the present invention.
Figure 5:
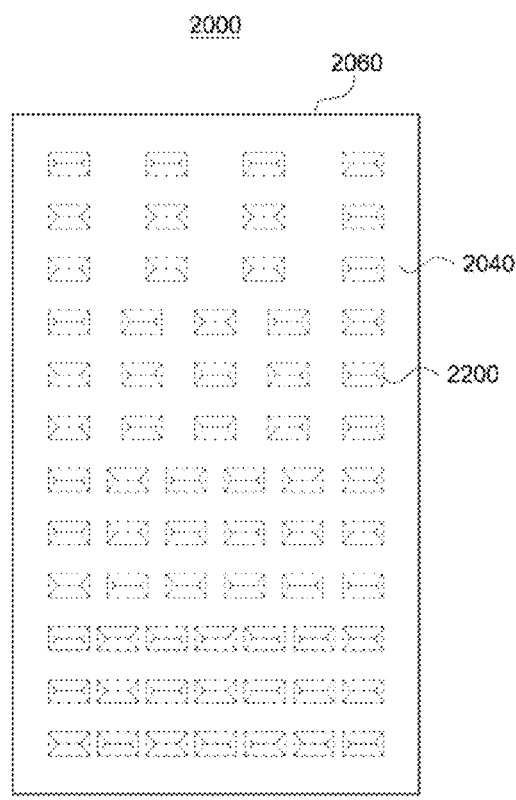
FIG. 5 is a rear view of a light guide plate with non-uniform density of reflective patterns according to an embodiment of the present invention.
Figure 6:
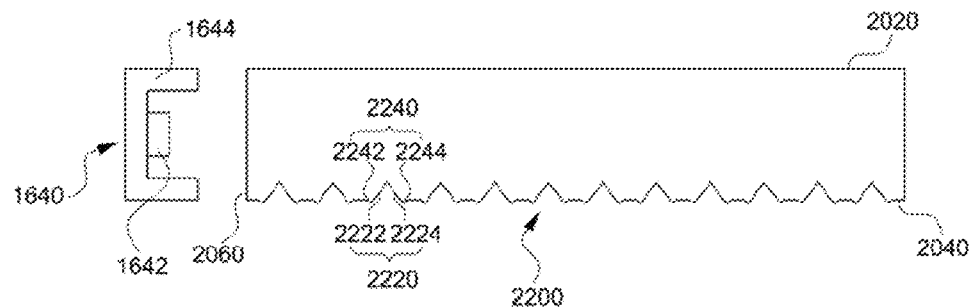
FIG. 6 is a cross-sectional view of a light guide plate according to an embodiment of the present invention.
Figure 7:
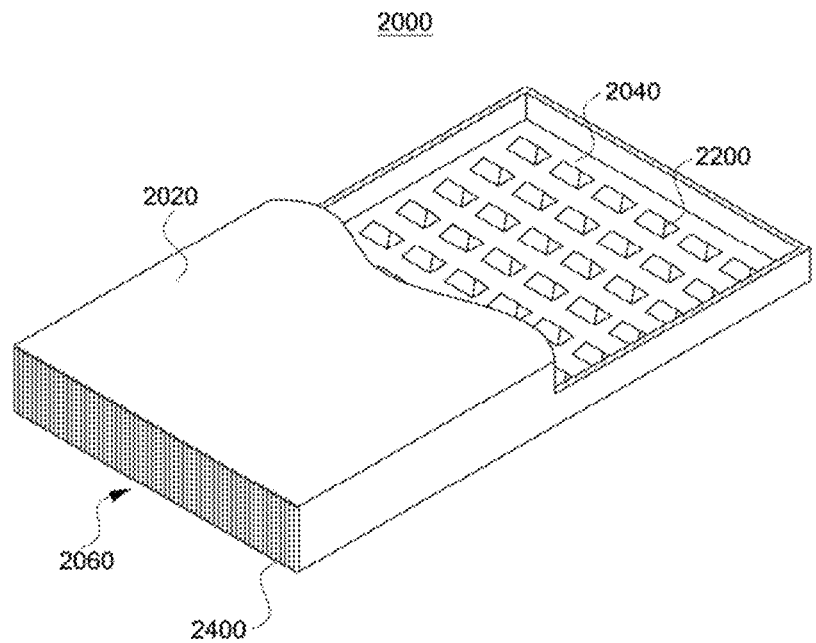
FIG. 7 is a perspective view of a light guide plate with patterns formed at a light incident surface according to an embodiment of the present invention.
Figure 8:
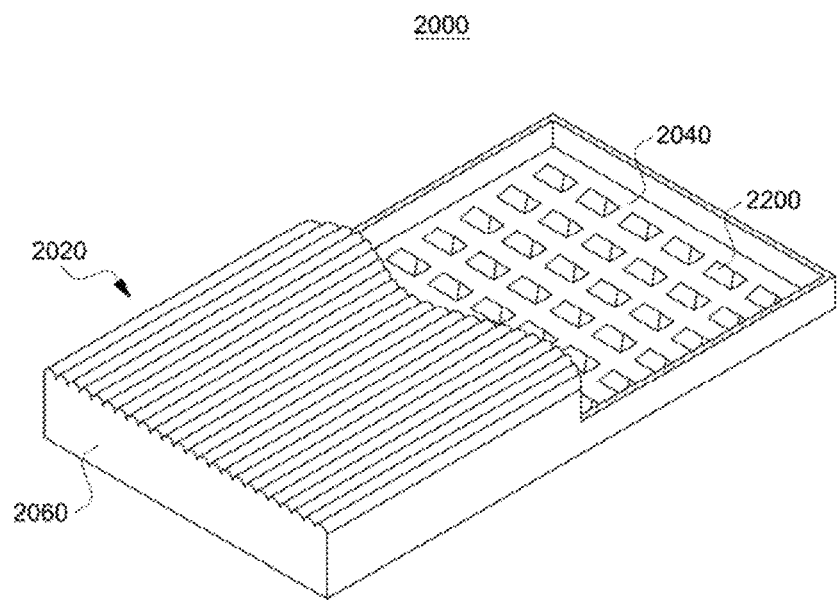
FIG. 8 is a perspective view of a light guide plate with patterns formed at a light output surface according to an embodiment of the present invention.

FIG. 3 is a perspective view of a light guide plate 2000 according to an embodiment of the present invention; FIG. 4 is a rear view of a light guide plate 2000 with uniform density of reflective patterns 2200 according to an embodiment of the present invention; FIG. 5 is a rear view of a light guide plate 2000 with non-uniform density of reflective patterns 2200 according to an embodiment of the present invention; FIG. 6 is a cross-sectional view of a light guide plate 2000 according to an embodiment of the present invention; FIG. 7 is a perspective view of a light guide plate 2000 with patterns formed at a light incident surface 2060 according to an embodiment of the present invention; and FIG. 8 is a perspective view of a light guide plate 2000 with patterns formed at a light output surface 2020 according to an embodiment of the present invention.

Referring to FIGS. 3 to 8, the light guide plate 2000 may be provided in a plate shape. Accordingly, the light guide plate 2000 may have a pair of primary surfaces and side surfaces connecting the primary surfaces. Of the pair of primary surfaces, an upper surface close to the display panel 1400 is a light output surface 2020 outputting light toward the display panel 1400, and the opposite surface is a reflective surface 2040 reflecting light. Furthermore, at least one surface among the side surfaces is a light incident surface 2060 arranged to face the light source 1642 to receive light. Generally, since the display device 1000 has a quadrilateral screen, the light guide plate 2000 may be formed in a shape of a quadrilateral plate to correspond to the screen of the display device 1000. In the case of the light guide plate 2000 formed in the shape of a quadrilateral plate, any one surface among four side surfaces, a pair of surfaces vertically facing each other, or a pair of surfaces horizontally facing each other may be the light incident surface 2060. Meanwhile, even though it is depicted in FIG. 3 that the light guide plate 2000 is a flat plate with uniform thickness overall, the thickness does not have to be uniform at all times. For example, it is possible that a region nearby a side surface facing the light source 1642 is formed thicker than other regions in the light guide plate 2000.

The light guide plate 2000 receives light projected from the light source 1642 through the light incident surface 2060 to guide the light at the inner portion of the light guide plate 2000, thereby outputting the light in the form of surface light source 1642 through the light output surface 2020. The reflective surface 2040 performs a role of reflecting light exiting to the rear surface of the light guide plate 2000 toward the light output surface 2020. Patterns for effectively performing light incidence, light guidance, and light reflection may be respectively formed at the light incident surface 2060, the light output surface 2020, and the reflective surface 2040. In particular, at the reflective surface 2040, a reflective pattern 2200 to reflect light exiting to the rear surface of the light guide plate 2000, i.e. the reflective surface 2040, may be formed.

On the reflective surface 2040, a plurality of reflective patterns 2200 may be formed. Here, the reflective patterns 2200 may be formed in uniform density at the reflective surface 2040 as depicted in FIG. 4, or may be formed in non-uniform density as depicted in FIG. 5. In particular, in case of a large screen, a difference in luminance can be generated between portions close to and far from the light incident surface 2060 of the light guide plate 2000, but the difference can be mitigated by forming the reflective patterns 2200 more densely at the portion far from the light incident surface 2060 than at the portion close to the light incident surface 2060. Here, the density of the reflective patterns 2200 may be defined by a coverage rate in which the reflective patterns 2200 occupy the reflective surface 2040, the size of the reflective patterns 2200, the intervals of the reflective patterns 2200, etc.

The reflective patterns 2200 may be formed by silk screening, printing, laser etching, depositing, pressing, roll stamping, and the like. By the processes, the reflective patterns 2200 may be formed in a particular shape to effectively refract or reflect light exiting to the rear surface of the light guide plate 2000 toward the light output surface 2020. Detailed description on the shape of the reflective patterns 2200 will be provided later.

Meanwhile, at the light incident surface 2060 of the light guide plate 2000, a serration pattern 2400 to improve a distribution angle of light incident from the light source 1642 and a diffusion effect may be formed. As depicted in FIG. 7, the serration pattern 2400 may be mostly formed at the light incident surface 2060 so that an embossed portion and a concave portion extending in a vertical direction are repetitively arranged in the width direction of the light incident surface 2060. In addition, at the light output surface 2020 of the light guide plate 2000, a light guide pattern 2600 to guide light incident upon the light incident surface 2060 throughout the light guide plate 2000 may be formed. The light guide pattern 2600 is repetitively formed at the light output surface 2020 to extend in a direction perpendicular to the light incident surface 2060 and may have a lenticular pattern or be formed in a triangular or rectangular prism pattern, as depicted in FIG. 8.

The serration pattern 2400 or the light guide pattern 2600 may be provided at the light guide plate 2000 with the reflective patterns 2200, and it is possible that the serration pattern 2400, the light guide pattern 2600, and the reflective patterns 2200 are all formed at the light guide plate 2000.

Hereinafter, reflective patterns 2200 according to an embodiment of the present invention will be described.

The reflective patterns 2200 are protruded or recessed from the reflective surface 2040 to be formed in a particular shape, thereby reflecting light exiting to the rear surface of the light guide plate 2000. Like this, if light is reflected, the amount of light outputted by the light output surface 2020 of the light guide plate 2000 increases as a result, thereby increasing luminance of the display device 1000.

In the present invention, the reflective patterns 2200 can be basically provided in a prism pattern. Overall, when viewed in a direction perpendicular to the reflective surface 2040, the reflective patterns 2200 may have a portion recessed in a shape of a prism on the reflective surface 2040 and a portion protruding by surrounding the recessed portion.

The reflective patterns 2200 may be mainly formed by roll stamping or pressing. Specifically, the recessed portion may be formed by digging the reflective surface 2040 by roll stamping or pressing, and the protruding portion can be formed as the recessed portion is pushed toward surrounding portions. Here, if the roll stamping or pressing is performed by a thermal pressing method, patterns can be formed effectively.

The reflective patterns 2200 reflect, refract, or scatter light incident from the light incident surface 2060 to proceed to the reflective surface 2040 or light reflected from the light output surface 2020 to proceed to the reflective surface 2040 in each of the regions, thereby effectively reflecting light. Specifically, the reflective patterns 2200 primarily refract, scatter, diffuse, and reflect light at an embossed portion 2240, and a concave portion 2220 can refract, scatter, diffuse, and reflect the light again. In particular, the embossed portion 2240 primarily scatters light incident upon the reflective patterns 2200, thereby causing an overall increase in uniformity of luminance at the light output surface 2020.

Hereinafter, a first example among various shapes of reflective patterns 2200 according to an embodiment of the present invention will be described.

Figure 9:
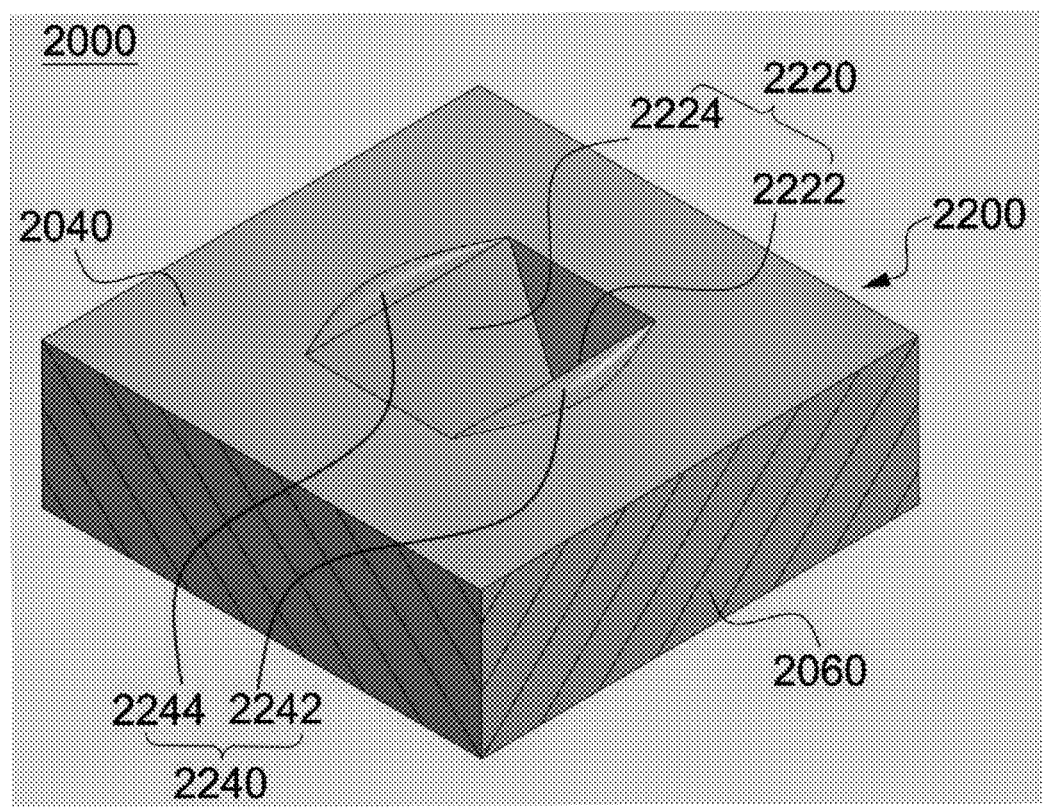
FIG. 9 is a perspective view of a first example of reflective patterns according to an embodiment of the present invention.
Figure 10:
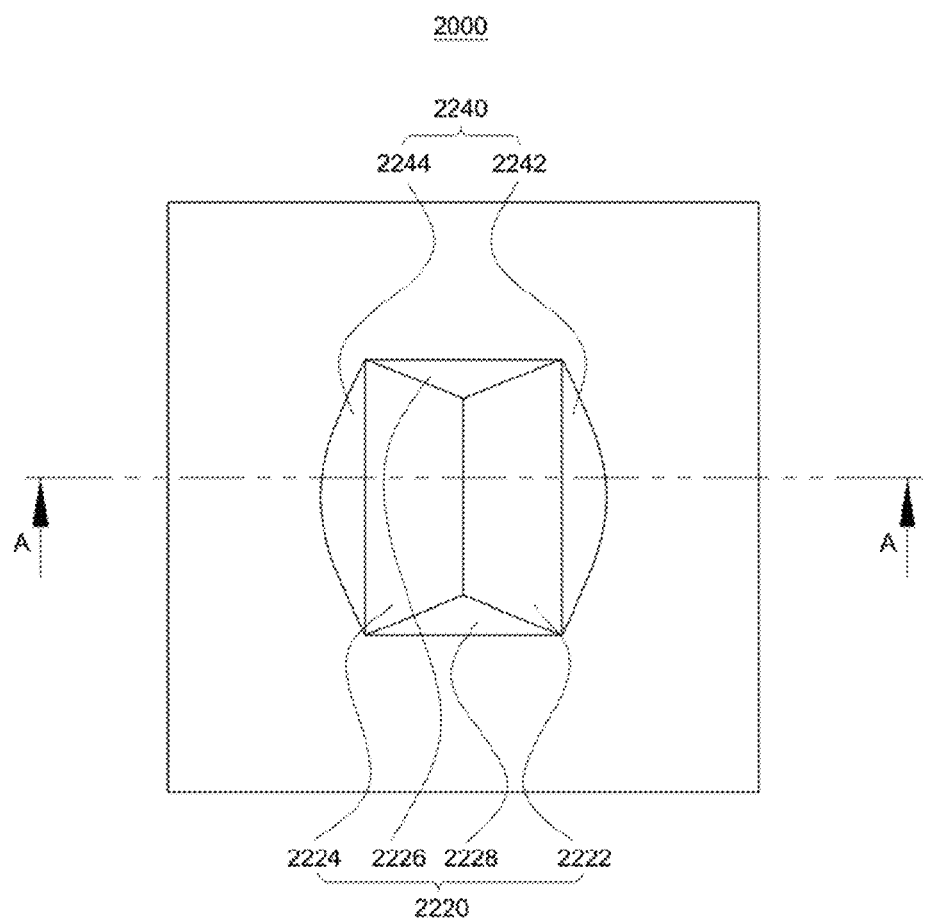
FIG. 10 is a planar view of the first example of reflective patterns according to an embodiment of the present invention.

FIG. 9 is a perspective view of a first example of reflective patterns 2200 according to an embodiment of the present invention; FIG. 10 is a planar view of the first example of reflective patterns 2200 according to an embodiment of the present invention; and FIG. 11 is a cross-sectional view of the first example of reflective patterns 2200 according to an embodiment of the present invention.

Figure 11:
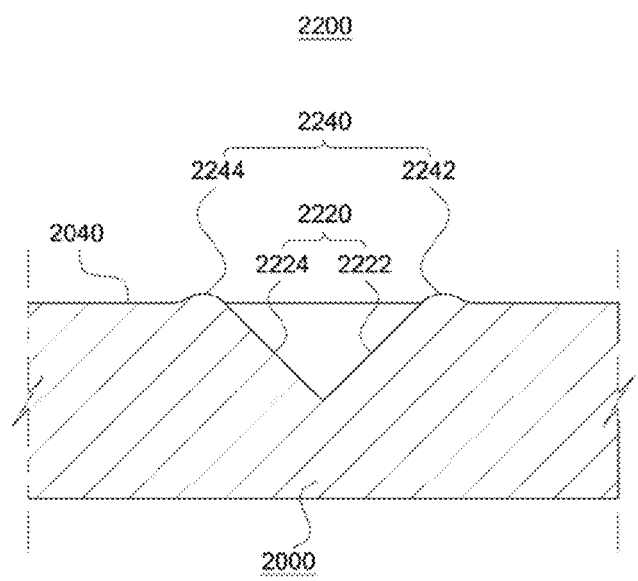
FIG. 11 is a cross-sectional view of the first example of reflective patterns according to an embodiment of the present invention.

Referring to FIGS. 9 to 11, the first example of reflective patterns 2200 according to an embodiment of the present invention may include the concave portion 2220 and the embossed portion 2240.

The concave portion 2220 is a portion more recessed toward inside than a reference surface of the reflective surface 2040. Here, the concave portion 2220 may include a first inclined surface 2222, a second inclined surface 2224, a third inclined surface 2226, and a fourth inclined surface 2228.

In the first example of the reflective patterns 2200, when viewed in a direction perpendicular to the reflective surface 2040, the concave portion 2220 may be formed in a quadrilateral shape, and may be provided in a shape of a square or rectangle. Edges of the first inclined surface 2222 and the second inclined surface 2224 coming in contact with the reflective surface 2040 may be parallel to the light incident surface 2060. The first inclined surface 2222 may be inclined from the edge coming in contact with the reflective surface 2040 toward the light output surface 2020. The second inclined surface 2224 may be inclined from the edge coming in contact with the reflective surface 2040 toward the light output surface 2020. Furthermore, end portions of the first inclined surface 2222 and the second inclined surface 2224 may be connected to each other. The third inclined surface 2226 and the fourth inclined surface 2228 may be recessed from the reflective surface 2040 to be connected to corners of the first inclined surface 2222, the second inclined surface 2224, and the reflective surface 2040. Accordingly, three-dimensional shapes of each of the inclined surfaces 2222, 2224, 2226, and 2228 may have a prism shape. In other words, the depth of the concave portion 2220 may progressively increase from the edge (a border coming in contact with the embossed portion 2240) toward a central portion of the concave portion 2220, and the third inclined surface 2226 and the fourth inclined surface 2228 may be formed between both ends of the first inclined surface 2222 and the second inclined surface 2224. Here, the inclined angles of the first inclined surface 2222 and the second inclined surface 2224 may be equal to each other, and the inclined angles of the third inclined surface 2226 and the fourth inclined surface 2228 may also be equal to each other.

The embossed portion 2240 may protrude toward an outer portion of the reflective surface 2040 at the edge of the concave portion 2220.

The embossed portion 2240 may include a first protruding region 2242 protruding from an edge of the first inclined surface 2222 toward the outer portion of the reflective surface 2040; and a second protruding region 2244 protruding from an edge of the second inclined surface 2224 toward the outer portion of the reflective surface 2040. Here, in the first example, the size of the first protruding region 2242 may be the same with that of the second protruding region 2244.

The protruding height of the embossed portion 2240 may decrease after progressively increasing from the edge of the concave portion 2220 toward outside. In addition, the embossed portion 2240 is arranged at the outermost portion of the reflective patterns 2200 to primarily scatter light incident upon the reflective patterns 2200, enabling the light reflected by the reflective patterns 2200 to be scattered and diffused to be projected to the light output surface 2020, thereby greatly improving uniformity in luminance.

Hereinafter, a second example among various shapes of reflective patterns 2200 according to an embodiment of the present invention will be described.

Figure 12:
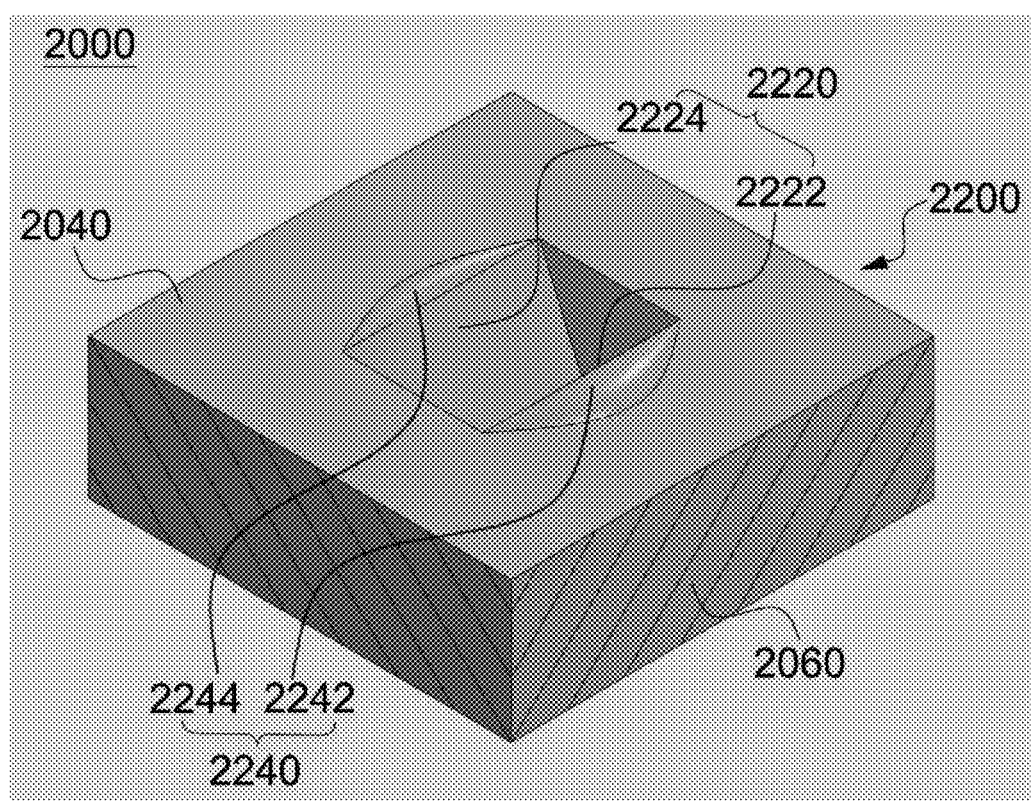
FIG. 12 is a perspective view of a second example of reflective patterns according to an embodiment of the present invention.
Figure 13:
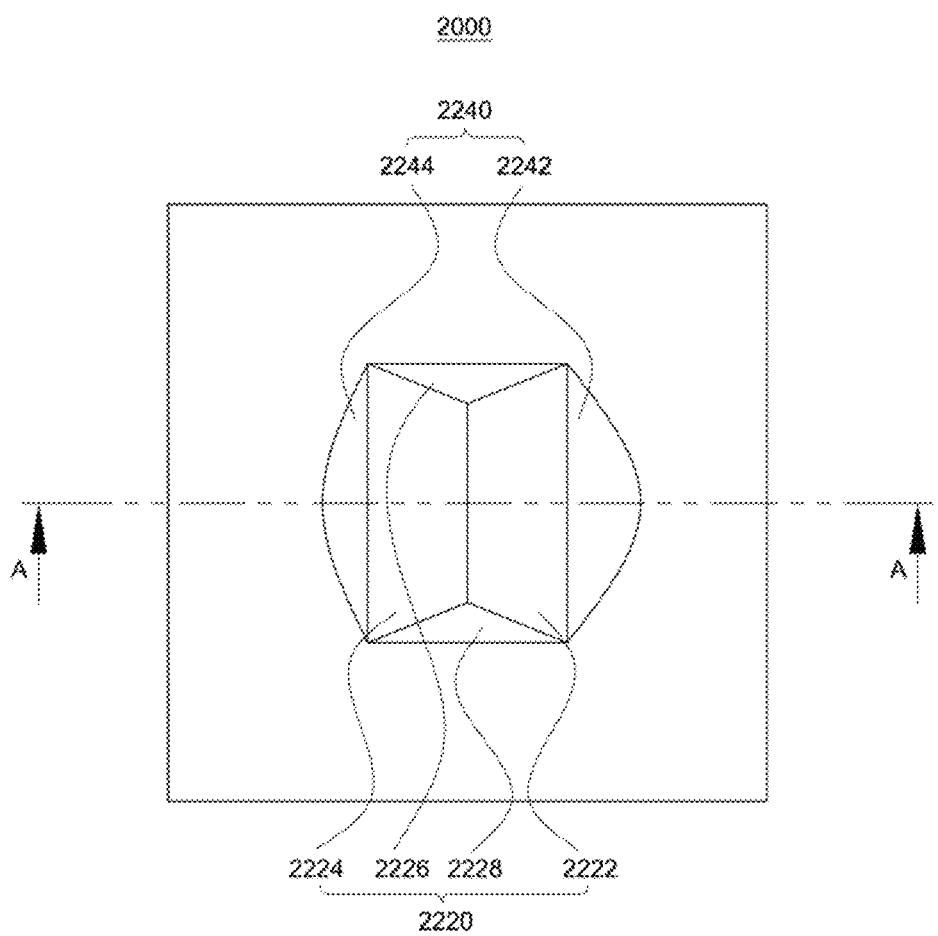
FIG. 13 is a planar view of the second example of reflective patterns according to an embodiment of the present invention.

FIG. 12 is a perspective view of a second example of reflective patterns 2200 according to an embodiment of the present invention; FIG. 13 is a planar view of the second example of reflective patterns 2200 according to an embodiment of the present invention; and FIG. 14 is a cross-sectional view of the second example of reflective patterns 2200 according to an embodiment of the present invention.

Figure 14:
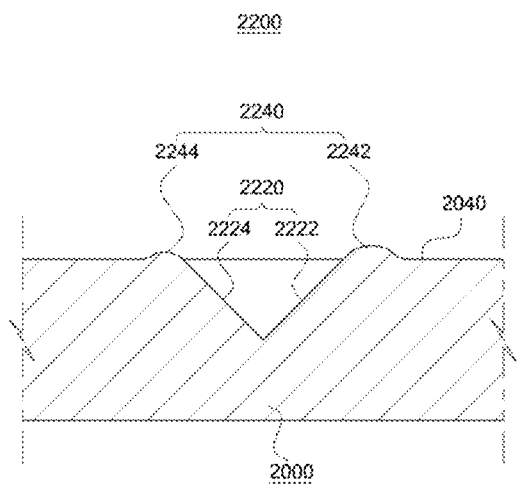
FIG. 14 is a cross-sectional view of the second example of reflective patterns according to an embodiment of the present invention.

Referring to FIGS. 12 to 14, the second example of the reflective patterns 2200 according to an embodiment of the present invention may include a concave portion 2220 and an embossed portion 2240. However, while the shape of the first protruding region 2242 of the embossed portion 2240 is symmetrical to that of the second protruding region 2244 in the first example, the shape of the first protruding region 2242 may be asymmetrical to that of the second protruding region 2244 in the second example.

Since the shape of the concave portion 2220 in the second example of the reflective patterns 2200 may be similar with that in the first example of the reflective patterns 2200, the description thereof will be omitted.

In the second example of the reflective patterns 2200, the first protruding region 2242 and the second protruding region 2244 of the embossed portion 2240 may be asymmetrical to each other with respect to the concave portion 2220. The height of the embossed portion 2240 may decrease after progressively increasing from the edge (a border coming in contact with the concave portion 2220) toward outside. In particular, the protruding height of any one of the first protruding region 2242 and the second protruding region 2244 may be greater than that of the other. Here, a protruding region with greater protruding height or area may be formed at the side of the light incident surface 2060, and a protruding region with smaller protruding height or area may be formed at the opposite side of the light incident surface 2060.

The second example of the reflective patterns 2200 is asymmetrical, thereby having anisotropic optical characteristics instead of isotropic optical characteristics. Specifically, one side with great thickness and great maximum height can scatter light better than the opposite side. The opposite side can provide better field of view compared with the one side. Consequently, improving uniformity in luminance or field of view of the display device 1000 is possible if the anisotropic optical characteristics are used.

Still, the portion with smaller protruding height or area may be arranged close to the light incident surface 2060, and the other portion may be arranged far from the light incident surface 2060 as necessary.

Hereinafter, a third example among various shapes of reflective patterns 2200 according to an embodiment of the present invention will be described.

Figure 15:
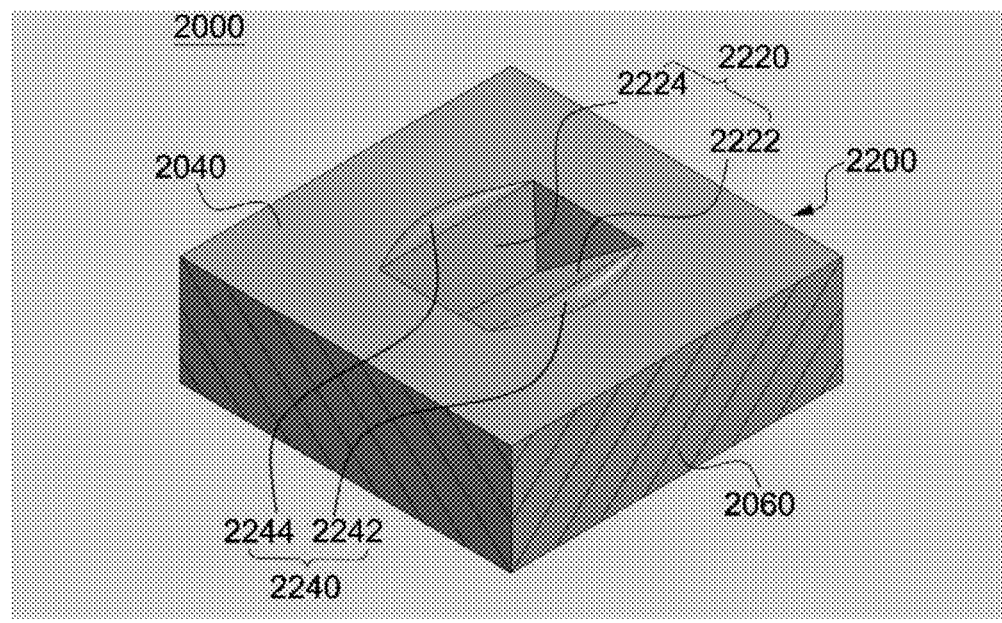
FIG. 15 is a perspective view of a third example of reflective patterns according to an embodiment of the present invention.
Figure 16:
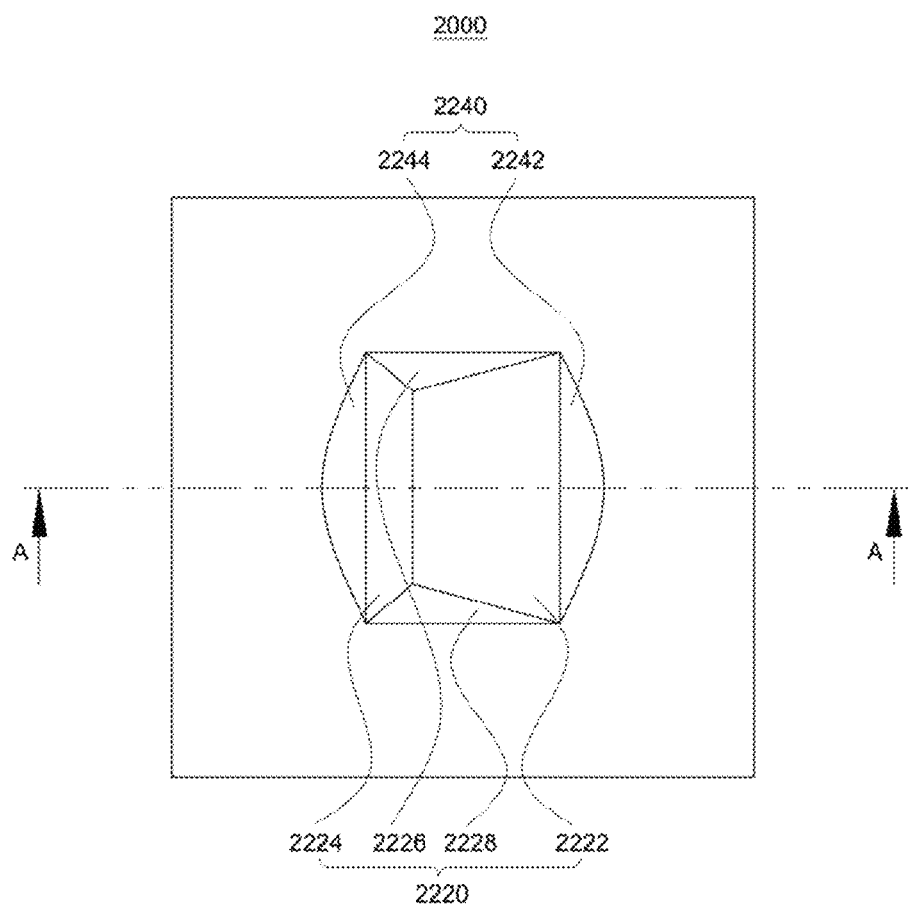
FIG. 16 is a planar view of the third example of reflective patterns according to an embodiment of the present invention.

FIG. 15 is a perspective of a third example of reflective patterns 2200 according to an embodiment of the present invention; FIG. 16 is a planar view of the third example of reflective patterns 2200 according to an embodiment of the present invention; and FIG. 17 is a cross-sectional view of the third example of reflective patterns 2200 according to an embodiment of the present invention.

Figure 17:
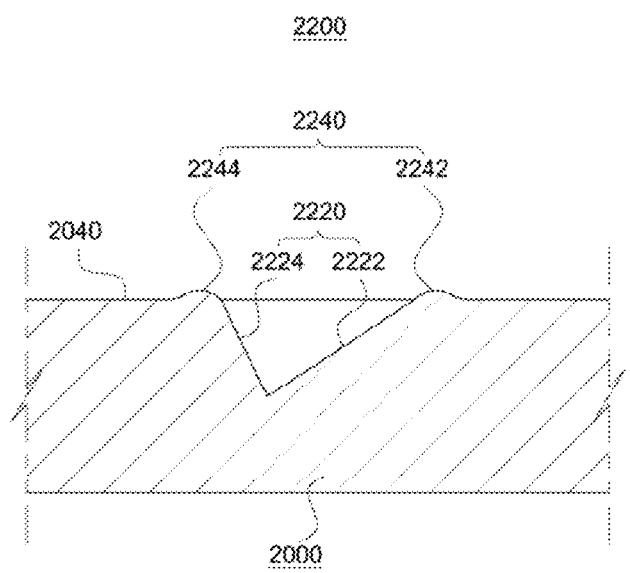
FIG. 17 is a cross-sectional view of the third example of reflective patterns according to an embodiment of the present invention.

Referring to FIGS. 15 to 17, the third example of reflective patterns 2200 according to an embodiment of the present invention may include a concave portion 2220 and an embossed portion 2240. However, while the inclined angle of the first inclined surface 2222 of the concave portion 2220 is equal to that of the second inclined surface 2224 in the first example, the inclined angle of the first inclined surface 2222 of the concave portion 2220 may be different from that of the second inclined surface 2224 in the third example.

Since the shape of the embossed portion 2240 in the third example of the reflective patterns 2200 may be similar with that in the first example of the reflective patterns 2200, the description thereof will be omitted.

In the third example of the reflective patterns 2200, the inclined angle of the first inclined surface 2222 may be different from that of the second inclined surface 2224 in the concave portion 2220. For example, the inclined angle of the first inclined surface 2222 may be formed smaller than that of the second inclined surface 2224. Here, the first inclined surface 2222 may be a gently inclined surface and may be formed at a portion close to the light incident surface 2060. If a gently inclined portion is close to the light incident surface 2060, light incident from the light incident surface 2060 may be refracted and reflected toward the light output surface 2020 in a wide range. Still, a portion with a greater inclined angle can be arranged close to the light incident surface as necessary.

Hereinafter, a fourth example among various shapes of reflective patterns 2200 according to an embodiment of the present invention will be described.

Figure 18:
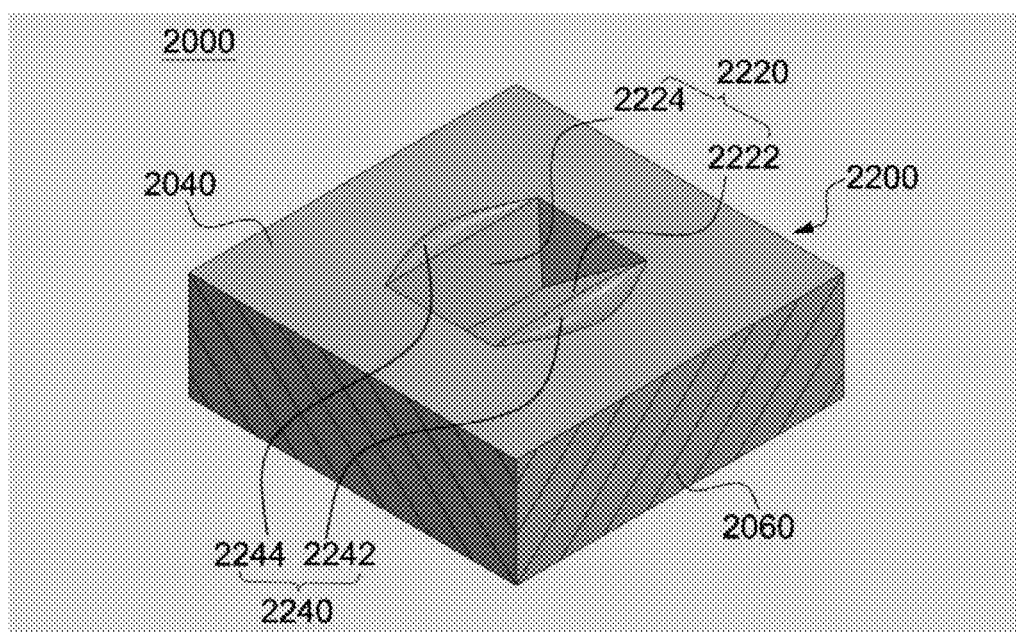
FIG. 18 is a perspective view of a fourth example of reflective patterns according to an embodiment of the present invention.
Figure 19:
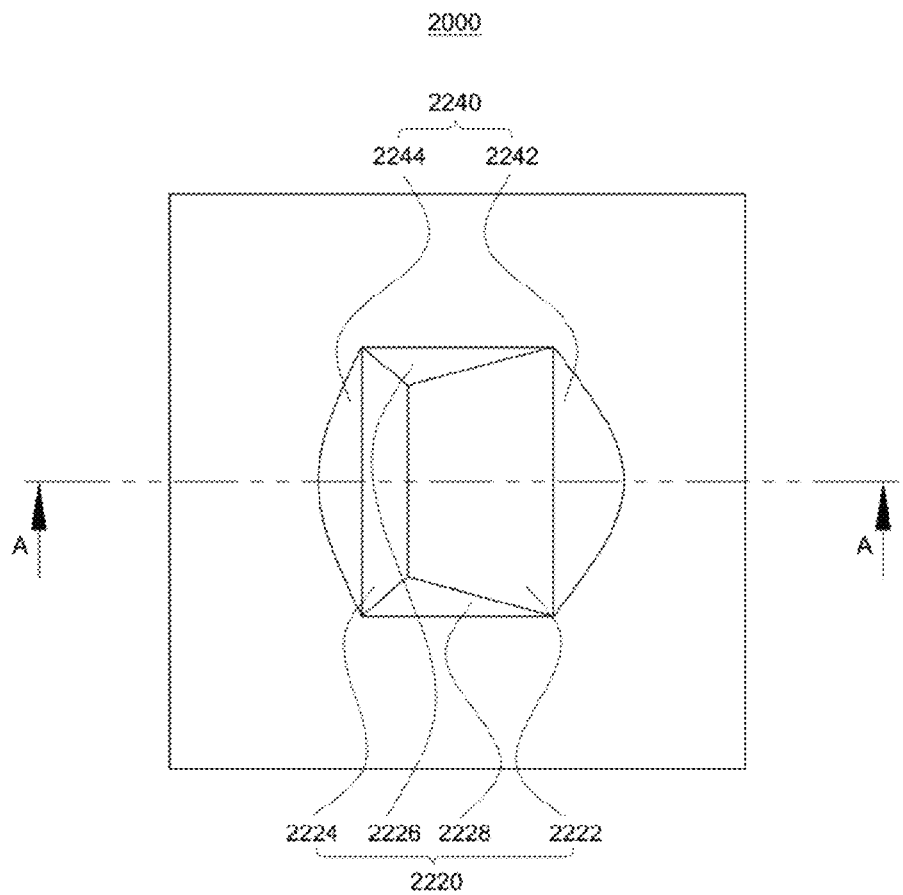
FIG. 19 is a planar view of the fourth example of reflective patterns according to an embodiment of the present invention.

FIG. 18 is a perspective view of a fourth example of reflective patterns 2200 according to an embodiment of the present invention; FIG. 19 is a planar view of the fourth example of reflective patterns 2200 according to an embodiment of the present invention; and FIG. 20 is a cross-sectional view of the fourth example of reflective patterns 2200 according to an embodiment of the present invention.

Figure 20:
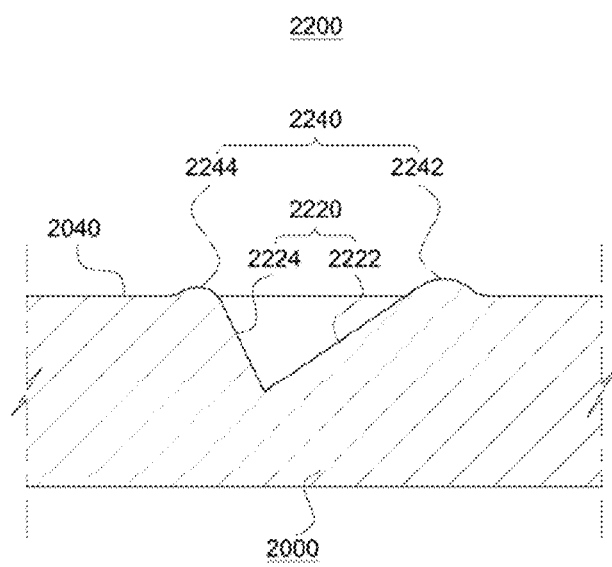
FIG. 20 is a cross-sectional view of the fourth example of reflective patterns according to an embodiment of the present invention.

Referring to FIGS. 18 to 20, the fourth example of the reflective patterns 2200 according to an embodiment of the present invention may include a concave portion 2220 and an embossed portion 2240. However, while the shape of the first protruding region 2242 of the embossed portion 2240 is symmetrical to that of the second protruding region 2244 in the third example, the shape of the first protruding region 2242 may be asymmetrical to that of the second protruding region 2244 in the fourth example.

Since the shape of the concave portion 2220 in the fourth example of the reflective patterns 2200 may be similar with that in the third example of the reflective patterns 2200, the description thereof will be omitted.

In the fourth example of the reflective patterns 2200, the first protruding region 2242 and the second protruding region 2244 may be asymmetrical with respect to the concave portion 2220 in the embossed portion 2240. The height of the embossed portion 2240 may decrease after progressively increasing from the edge (a border coming in contact with the concave portion 2220) toward outside. In addition, the protruding height of any one of the first protruding region 2242 and the second protruding region 2244 may be formed greater than that of the other. In particular, a region protruding from an edge of a gently inclined surface may have greater size and protruding height compared with a region protruding from an edge of a steeply inclined surface. Meanwhile, a protruding region with greater protruding height may be formed at the side of the light incident surface 2060, and a protruding region with relatively lower protruding height may be formed at the opposite side of the light incident surface 2060.

The fourth example of the reflective patterns 2200 is asymmetrical, thereby having anisotropic optical characteristics instead of isotropic optical characteristics. Specifically, one side with great thickness and great maximum height can scatter light better than the opposite side. The opposite side can provide better field of view compared with the one side. Consequently, improving uniformity in luminance or field of view of the display device 1000 is possible if the anisotropic optical characteristics are used.

Meanwhile, even though it is described above that the embossed portion 2240 with great protruding height or area is formed at a gently inclined surface, the embossed portion 2240 with great protruding height or area may also be formed at a steeply inclined surface as necessary. In addition, even though it is described above that a gently inclined surface is arranged close to the light incident surface 2060, a steeply inclined surface may also be arranged close to the light incident surface 2060.

Figure 21:
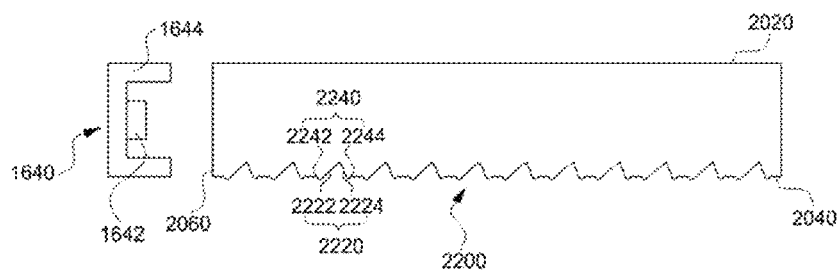
FIG. 21 is a cross-sectional view of a light guide plate with asymmetrical reflective patterns according to an embodiment of the present invention.

FIG. 21 is a cross-sectional view of a light guide plate 2000 with asymmetrical reflective patterns 2200 according to an embodiment of the present invention.

Referring to FIG. 21, in the reflective patterns 2200, an inclined surface in which the height of the embossed portion 2240 is great and an inclined angle of the concave portion 2220 is small may be arranged close to the light incident surface 2060 at the reflective surface 2040. Generally, light entering the reflective patterns 2200 is mostly proceeded from the light incident surface 2060. Accordingly, a gently inclined surface (the first inclined surface 2222) of the concave portion 2220 and a region (the first protruding region 2242) with great height and thickness of the embossed portion 2240 are arranged in the light incident direction, thereby maximizing a light diffusion effect and a light scattering effect of the embossed portion 2240.

Meanwhile, in the display device 1000, horizontal field of view is more important than vertical field of view. Accordingly, a region of the embossed portion 2240 with great maximum height and thickness is vertically arranged when the display device 1000 is watched, thereby preventing the horizontal field of view from being degraded. Furthermore, in accordance with a more important field of view of a lower field of view and an upper field of view in the vertical field of view, a region of the embossed portion 2240 with great maximum height and thickness may be arranged to face an upper direction or lower direction of the display device 1000.

Meanwhile, in some cases, to secure uniformity in luminance and field of view at the same time, the light source array 1640 may be arranged in a lower direction, and the reflective patterns 2200 may be formed in a way that a portion with a great embossed portion 2240 is arranged toward the lower direction.

Hereinafter, reflective patterns 2200 according to a modification of the present invention will be described.

Figure 22:
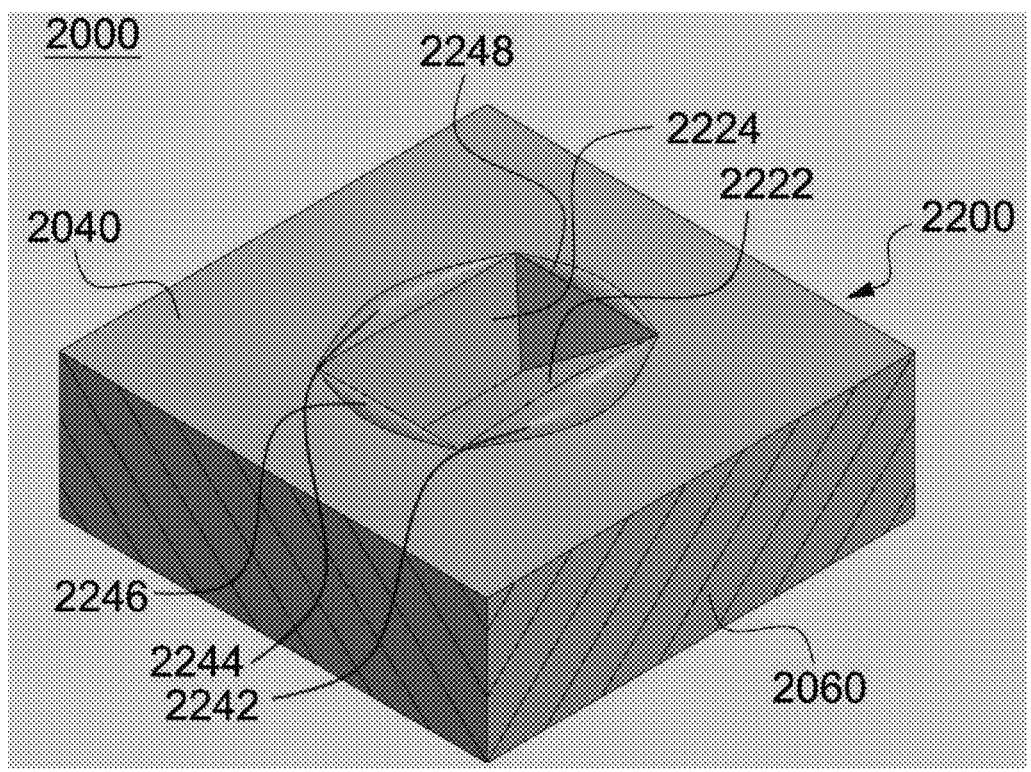
FIG. 22 is a perspective view of reflective patterns according to a modification of the present invention.
Figure 23:
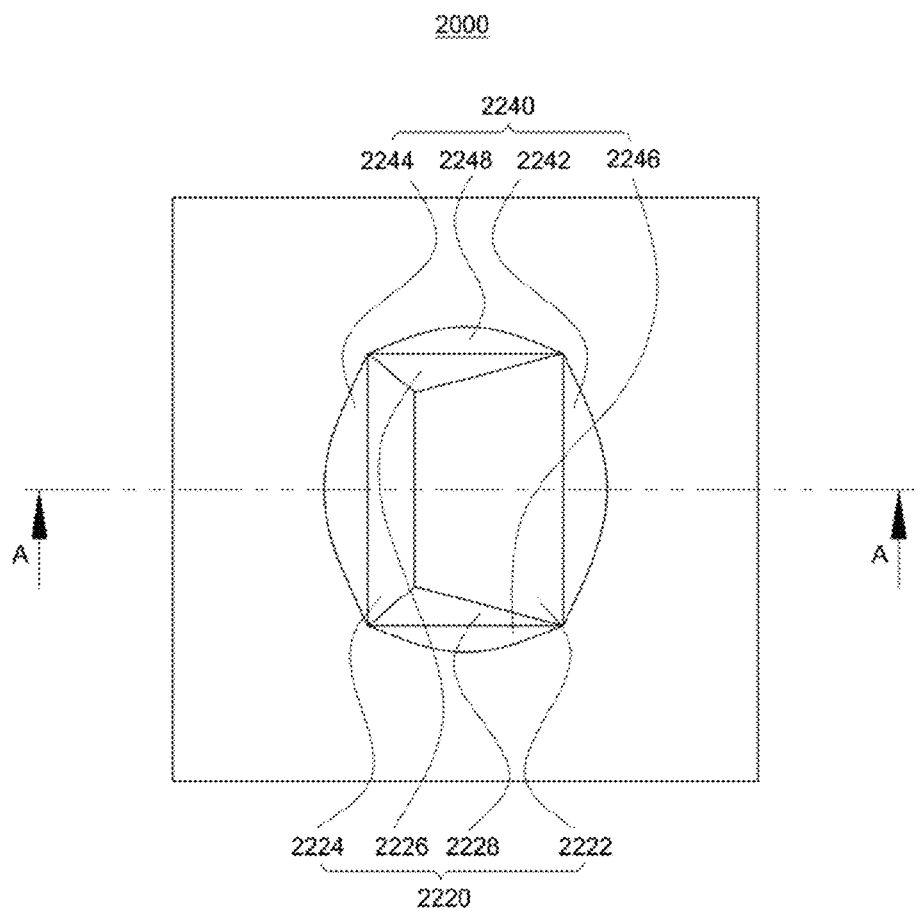
FIG. 23 is a planar view of reflective patterns according to a modification of the present invention.

FIG. 22 is a perspective view of reflective patterns 2200 according to a modification of the present invention; FIG. 23 is a planar view of reflective patterns 2200 according to a modification of the present invention; and FIG. 24 is a cross-sectional view of reflective patterns 2200 according to a modification of the present invention.

Figure 24:
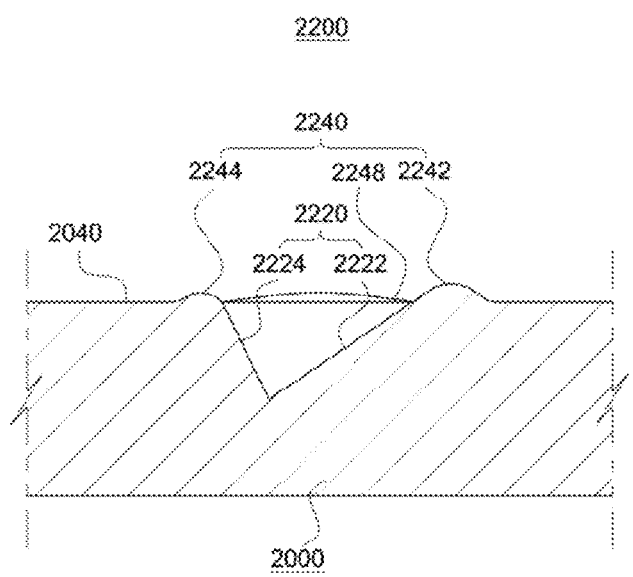
FIG. 24 is a cross-sectional view of reflective patterns according to a modification of the present invention.

Referring to FIGS. 22 to 24, the reflective patterns 2200 according to a modification of the present invention may include a concave portion 2220 and an embossed portion 2240. However, in the modification, a third protruding region 2246 and a fourth protruding region 2248 protruding toward the outside may be further included.

Since the shape of the concave portion 2220 in the modified example of the reflective patterns 2200 may be similar with that in the fourth example of the reflective patterns 2200, the description thereof will be omitted.

The modified example of the reflective patterns 2200 includes the embossed portion 2240 formed in a direction perpendicular to the first protruding region 2242 and the second protruding region 2244, and may further include a third protruding region 2246 protruding from an edge of the third inclined surface 2226 toward the outside; and a fourth protruding region 2248 protruding from an edge of the fourth inclined surface 2228 toward the outside. The third protruding region 2246 and the fourth protruding region 2248 may be formed perpendicular to the light incident surface 2060, and the size of the third protruding region 2246 may be the same as or different from that of the fourth protruding region 2248.

The modified example of the reflective patterns 2200 is asymmetrical, thereby having anisotropic optical characteristics instead of isotropic optical characteristics. Specifically, one side with great thickness and small maximum depth can scatter light better than the opposite side. The opposite side can provide better field of view compared with the one side. Consequently, improving uniformity in luminance or field of view of the display device 1000 is possible if the anisotropic optical characteristics are used.

In the reflective patterns 2200 mentioned above according to an embodiment of the present invention, in terms of a vertical distance (an absolute value of height or depth), the maximum depth of the concave portion 2220 may be the greatest, and the maximum height of the embossed portion 2240 may be the next greatest. Specifically, the maximum depth of the concave portion 2220 may be about 20 to 100 µm, and the maximum height of the embossed portion 2240 may be about 0.5 to 10 µm. In addition, when viewed in a direction perpendicular to the reflective surface, the length of the long side of the concave portion 2220 may be about 20 to 150 µm, and the length of the short side thereof may be about 20 to 100 µm. The length of the long side of the concave portion 2220 may be extended up to the length of the light incident surface 2060 of the light guide plate 2000 as necessary. In addition, the length of the short side may also be set greater than the example mentioned above as necessary.

Meanwhile, the inclined angle of the first inclined surface 2222 of the concave portion 2220 may be in a range of 40 to 60°, and the inclined angle of the second inclined surface 2224 may in a range of 50 to 70°. In addition, the inclined angles of the third inclined surface 2226 and the fourth inclined surface 2228 may be about 50 to 90°.

Furthermore, even though it is depicted in the drawings that surfaces of the reflective patterns 2200 are smooth, the surfaces of the reflective patterns 2200 may have a predetermined value of roughness, and in particular, the concave portion 2220 and the embossed portion 2240 may have a value of roughness equal to or greater than a predetermined value.

However, specifications of the reflective patterns 2200 are not limited to the height, depth, width, angle of inclination, and value of roughness mentioned above, but may be properly modified as needed.

All reflective patterns 2200 formed at the reflective surface 2040 may substantially have the same specifications, or specifications of each of the reflective patterns 2200 may be different from each other in accordance with different portions of the reflective surface 2040 as needed. For example, if all reflective patterns 2200 are formed to have the same specifications, it is advantageous in terms of a manufacturing process, thereby saving the production cost. On the other hand, if the diameter of the reflective patterns 2200 is adjusted to become progressively smaller toward the light incident surface 2060, uniformity in luminance may be improved throughout the light output surface 2020 of the light guide plate 2000.

The exemplary embodiments of the present invention described above are disclosed for illustrative purposes, and those of ordinary skill in the art will be able to make various modifications, changes, and additions within the spirit and scope of the present invention while the modifications, changes, and additions should be construed as belonging to the scope of the patent claims below.

GLOSSARY

1000: Display device
1600: Backlight unit
2000: Light guide plate
2040: Reflective surface
2060: Light incident surface
2200: Reflective patterns
2220: Concave portion
2222: First inclined surface
2224: Second inclined surface
2240: Embossed portion
2242: First protruding region
2244: Second protruding region

What is claimed is:

1. A light guide plate, comprising:
   a light output surface configured to output light toward the outside;
   a reflective surface positioned at the opposite side of the light output surface;
   a light incident surface provided on at least one side surface among the side surfaces connecting the light output surface to the reflective surface to receive light irradiated from a light source; and a reflective pattern having a quadrilateral shape when viewed in a direction perpendicular to the reflective surface, and having a concave portion recessed toward an inner portion of the reflective surface and an embossed portion protruding from an edge of the concave portion toward an outer portion of the reflective surface, wherein the concave portion includes a first inclined surface inclined from the reflective surface toward the light output surface; and a second inclined surface inclined from the first inclined surface toward the reflective surface, wherein the embossed portion comprises a first protruding region formed at an edge in which the first inclined surface comes in contact with the reflective surface; and a second protruding region formed at an edge in which the second inclined surface comes in contact with the reflective surface, wherein the inclined angle of the first inclined surface is different from that of the second inclined surface in the concave portion, and wherein a region protruding from an edge of a gently inclined surface has greater size and protruding height compared with a region protruding from an edge of a steeply inclined surface.

2. The light guide plate of claim 1, wherein, in the concave portion, an inclined angle of one of the first inclined surface and the second inclined surface closer to the light incident surface is smaller than that of the other surface.

3. The light guide plate of claim 1, wherein the concave portion further comprises a flat surface formed between the first inclined surface and the second inclined surface and parallel to the reflective surface.

4. The light guide plate of claim 1, wherein, when viewed in the direction perpendicular to the light incident surface, the concave portion further comprises a pair of side inclined surfaces inclined from the reflective surface toward the light output surface to come in contact with the first inclined surface and the second inclined surface, respectively.

5. The light guide plate of claim 2, wherein the first inclined surface has an inclined angle in a range of 40 to 60°, and the second inclined surface has an inclined angle in a range of 50 to 70°.

6. The light guide plate of claim 4, wherein inclined angles of the pair of side inclined surfaces are equal to each other.

7. The light guide plate of claim 4, wherein the embossed portion further comprises a side protruding region formed at an edge in which the side inclined surface comes in contact with the reflective surface.

8. The light guide plate of claim 7, wherein the size of the side protruding region is smaller than those of the first protruding region and the second protruding region.

9. The light guide plate of claim 8, wherein the height of the side protruding region is smaller than those of the first protruding region and the second protruding region.

10. The light guide plate of claim 8, wherein, when viewed in the direction perpendicular to the reflective surface, the area of the side protruding region is smaller than those of the first protruding region and the second protruding region.

11. A backlight unit, comprising:
a light source to irradiate light; and
a light guide plate,
wherein the light guide plate comprises a light incident surface facing the light source to receive the light irradiated from the light source; a light output surface configured to output the light perpendicularly incident upon the light incident surface toward the outside; a reflective surface which is the opposite surface of the light output surface; and a plurality of reflective patterns provided at the reflective surface, and each of the reflective patterns comprises a concave portion recessed toward an inner portion of the reflective surface and an embossed portion protruding from an edge of the concave portion toward an outer portion of the reflective surface to be formed in a prism shape, wherein the plurality of reflective patterns are arranged parallel to the light incident surface, and when viewed from a side surface of the light incident surface, the concave portion comprises a first inclined surface inclined from the reflective surface toward the light output surface; and a second inclined surface inclined from the first inclined surface toward the reflective surface, wherein the embossed portion comprises a first protruding region formed at an edge in which the first inclined surface comes in contact with the reflective surface; and a second protruding region formed at an edge in which the second inclined surface comes in contact with the reflective surface, wherein the inclined angle of the first inclined surface is different from that of the second inclined surface in the concave portion, wherein a region protruding from an edge of a gently inclined surface has greater size and protruding height compared with a region protruding from an edge of a steeply inclined surface, and wherein a protruding region with greater protruding height is formed at the side of the light incident surface, and a protruding region with relatively lower protruding height is formed at the opposite side of the light incident surface.

12. The backlight unit of claim 11, wherein, in the concave portion, an inclined angle of one of the first inclined surface and the second inclined surface closer to the light incident surface is smaller than that of the other surface.

13. The backlight unit of claim 11, wherein the concave portion, when viewed in the direction perpendicular to the light incident surface, further comprises a pair of side inclined surfaces inclined from the reflective surface toward the light output surface to come in contact with the first inclined surface and the second inclined surface, respectively, and the embossed portion further comprises a side protruding region formed at an edge in which the side inclined surface comes in contact with the reflective surface.

* * * * *